(12) United States Patent
Williams

(10) Patent No.: US 9,514,297 B2
(45) Date of Patent: Dec. 6, 2016

(54) SYSTEMS AND METHODS FOR GESTURE LOCK OBFUSCATION

(75) Inventor: Rodney Owen Williams, Cary, NC (US)

(73) Assignee: HTC CORPORATION, Taoyuan (TW)

( * ) Notice: Subject to any disclaimer, the term of this patent is extended or adjusted under 35 U.S.C. 154(b) by 806 days.

(21) Appl. No.: 13/073,908

(22) Filed: Mar. 28, 2011

(65) Prior Publication Data

US 2012/0252410 A1 Oct. 4, 2012

(51) Int. Cl.
| | | |
|---|---|---|
| *G06F 3/041* | (2006.01) | |
| *G06F 21/00* | (2013.01) | |
| *G05B 19/00* | (2006.01) | |
| *G06F 21/36* | (2013.01) | |
| *G06F 3/0488* | (2013.01) | |
| *H04M 1/67* | (2006.01) | |

(52) U.S. Cl.
CPC ........... *G06F 21/36* (2013.01); *G06F 3/04883* (2013.01); *H04M 1/67* (2013.01); *H04M 2250/22* (2013.01)

(58) Field of Classification Search
CPC ....... G06F 21/36; G06F 3/04883; H04M 1/67; H04M 2250/22
USPC ........................ 715/863, 702; 726/6; 345/173
See application file for complete search history.

(56) References Cited

U.S. PATENT DOCUMENTS

| | | | | |
|---|---|---|---|---|
| 6,934,860 B1* | 8/2005 | Goldstein | ...................... | 713/183 |
| 8,036,433 B1* | 10/2011 | Wolff | ............................. | 382/119 |
| 8,904,479 B1* | 12/2014 | Johansson et al. | ............... | 726/2 |
| 2005/0234324 A1* | 10/2005 | Sugimoto | .......... | G06K 9/00228 600/407 |
| 2006/0174339 A1* | 8/2006 | Tao | ................................. | 726/18 |
| 2008/0083015 A1* | 4/2008 | Kim | ................................. | 726/2 |
| 2008/0278455 A1* | 11/2008 | Atkins et al. | ................. | 345/173 |
| 2009/0284482 A1* | 11/2009 | Chin | ............................. | 345/173 |
| 2009/0289916 A1* | 11/2009 | Dai | ............................... | 345/173 |
| 2010/0322485 A1* | 12/2010 | Riddiford | ...................... | 382/115 |
| 2011/0034208 A1* | 2/2011 | Gu et al. | ..................... | 455/550.1 |
| 2011/0260829 A1* | 10/2011 | Lee | ............................... | 340/5.51 |
| 2012/0102551 A1* | 4/2012 | Bidare | ............................. | 726/4 |
| 2012/0159593 A1* | 6/2012 | Griffin | .................... | G06F 21/36 726/7 |
| 2013/0047236 A1* | 2/2013 | Singh | ................................ | 726/7 |

OTHER PUBLICATIONS

European Search Report dated Sep. 8, 2011.
Aviv, A.J., et al.; "Smudge Attacks on Smartphone Touch Screens;" pp. 1-10.
"Schneier on Security: A Blog Covering Security and Security Technology;" Aug. 2010; pp. 1-5.

(Continued)

*Primary Examiner* — Jordany Nunez
(74) *Attorney, Agent, or Firm* — McClure, Qualey & Rodack, LLP

(57) ABSTRACT

A method is described for unlocking a mobile device. The method comprises reorienting, by the mobile device, a pre-defined grid displayed by the mobile device for unlocking the mobile device. The method further comprises displacing the pre-defined grid by an offset and receiving, by the mobile device, a gesture from a user for attempting to unlock the mobile device according to the grid. Based on the gesture for attempting to unlock the mobile device, a verification interface is displayed. The mobile device is unlocked in response to the user successfully tracing the verification pattern.

19 Claims, 8 Drawing Sheets

(56) References Cited

OTHER PUBLICATIONS

Issue 3146: Screen Unlock—Press the Dots Instead of Join the Dots?; Aug. 19, 2011; pp. 1-6.
"Schneier on Security: A Blog Covering Security and Security Technology;" Jul. 2009; pp. 1-13.
"Research Claims Hackers Could Figure Out Your Smartphone Password Via Screen Smudges;" Aug. 11, 2010; pp. 1-9.
European Examination Report dated Jul. 18, 2013.

* cited by examiner

SYSTEMS AND METHODS FOR GESTURE LOCK OBFUSCATION

TECHNICAL FIELD

The present disclosure generally relates to systems and methods for providing gesture lock obfuscation to enhance security.

BACKGROUND

Over the years, mobile devices such as smartphones have become widespread. With the rapid development in communication technology, smartphones have become an integral part of many people's lives given the portability, the convenient access to the Internet, and the growing number of applications available on smartphones. Today, individuals can perform a wide range of functions such as online banking, shopping, etc. via smartphones. Many smartphone browsers can be configured by users to remember passwords, form data, and other information to provide quick and easy access to account information, e-mails, and so on. Furthermore, smartphones typically store the names and addresses of contacts. In this regard, smartphones generally contain sensitive information. Smartphones typically allow users to lock their phones such that a passcode or finger gesture tracing a pre-defined pattern must be entered in order to unlock the phone. However, various perceived shortcomings exist with these security mechanisms.

SUMMARY

Briefly described, one embodiment, among others, is a method for unlocking a mobile device. The method comprises generating, by the mobile device, a reorientation angle and an offset. The method further comprises displaying a user interface for unlocking the mobile device, the user interface comprising a grid displayed according to the reorientation angle and the offset. The method also comprises receiving, by the mobile device, a gesture for attempting to unlock the mobile device. Based on the gesture for attempting to unlock the mobile device, a second user interface is displayed.

Another embodiment is system for unlocking a mobile device. The system comprises a reorientation module configured to reorient a grid displayed by the mobile device for receiving an unlocking gesture, the reorientation module reorienting the grid according to a reorientation angle. The system further comprises an offset module configured to displace the grid according to an offset and a verification pattern generator configured to display a verification pattern in response to a user successfully tracing an unlock pattern on the grid, the verification pattern generator unlocking the mobile device according to a user tracing the verification pattern.

Another embodiment is a method that comprises reorienting, by the mobile device, a pre-defined grid displayed by the mobile device for unlocking the mobile device and displacing the pre-defined grid by an offset. The method further comprises receiving, by the mobile device, a gesture from a user for attempting to unlock the mobile device according to the grid. Based on the gesture for attempting to unlock the mobile device, a verification interface is displayed.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 illustrates the reorientation and displacement of a grid.

DETAILED DESCRIPTION

Figure 1:
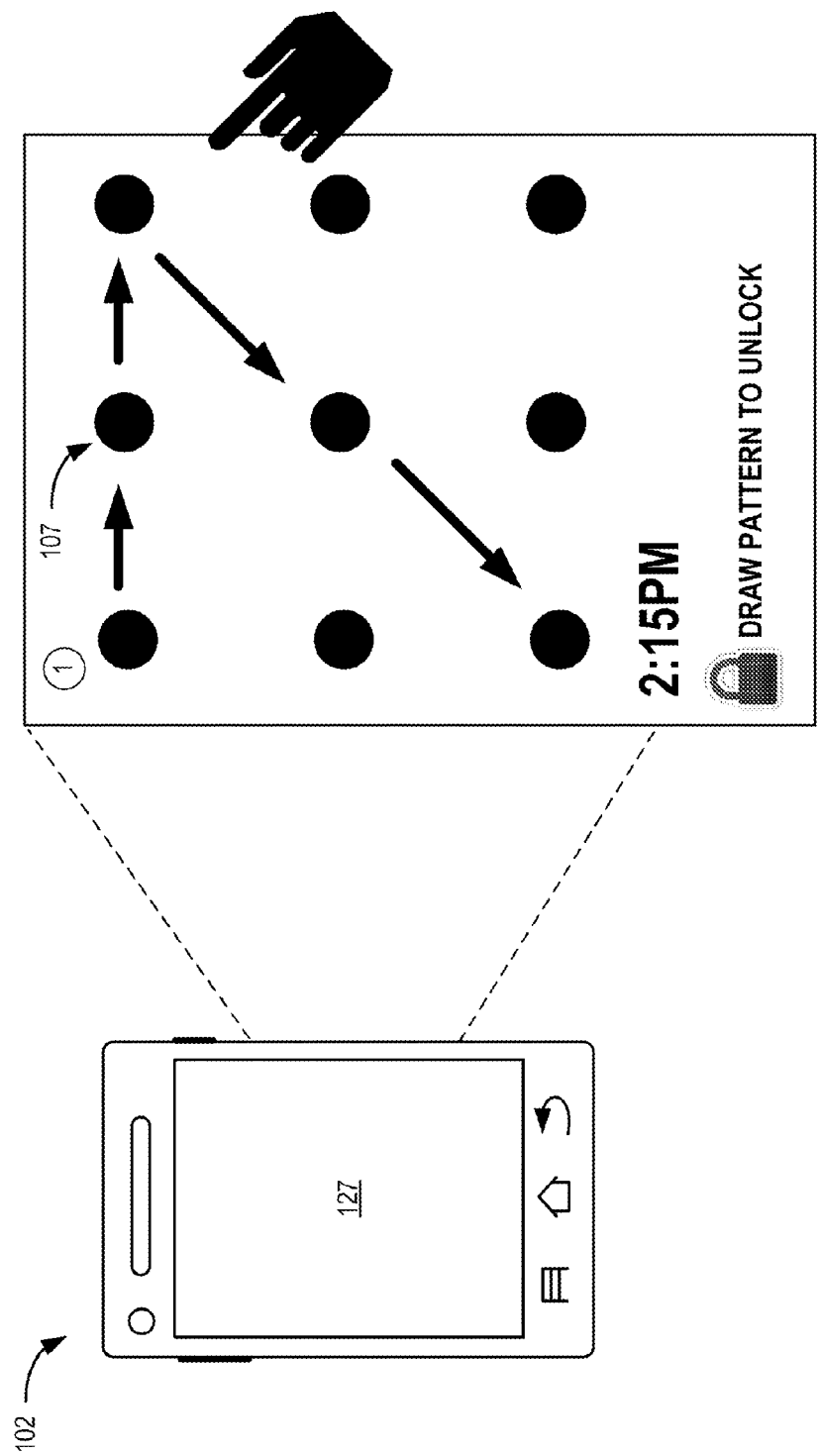
FIG. 1 illustrates a gesture unlocking mechanism provided by various mobile devices.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As discussed above, mobile devices such as smartphones have become an integral part of many people's lives given the portability, the convenient access to the Internet, and the growing number of applications available on mobile devices. Today, individuals can perform online banking, shopping, and other functions via their smartphones. Many smartphone browsers can be configured by users to remember passwords, form data, and other information. Furthermore, smartphones typically store the names and addresses of contacts. In this regard, smartphones generally contain sensitive information.

Most smartphones allow users to lock their phones such that a pre-defined passcode or finger pattern must be entered in order to unlock the phone. However, various perceived shortcomings exist with these security mechanisms. For example, in some cases, gesture unlock patterns set up by an authorized user can be discovered by viewing the finger smudge path on the glass. This smudge path is particularly visible when the screen is dark (off) as the unlock gesture is many times traced out in a more intentional fashion where the user exerts more finger pressure. This is in contrast to casual touchscreen inputs comprising, for example, a finger tap to select a link while browsing the web.

Various embodiments are described for providing a secure means of unlocking a mobile device. A multi-tiered security scheme is described comprising re-orientation and gross placement of a grid onto the display of the mobile device. For some embodiments, a random generator is utilized for the re-orientation and gross placement process. A second tier comprises a randomly generated verification pattern used in conjunction with the user-defined gesture pattern. For some embodiments, the sensitivity or accuracy level of the verification pattern is adjusted such that reduced accuracy is required on the part of the user for entering the verification pattern.

One embodiment, among others, is a method that comprises reorienting, by the mobile device, a pre-defined grid displayed by the mobile device for unlocking the mobile device. The method further comprises displacing the pre-defined grid by an offset and receiving, by the mobile device, a gesture from a user for attempting to unlock the mobile device according to the grid. Based on the gesture for attempting to unlock the mobile device, a verification interface is displayed. The mobile device is unlocked in response to the user successfully tracing the verification pattern. As will become apparent, variations and modifications may be made to the embodiments disclosed herein without departing from the principles of the present disclosure.

Reference is made to FIG. 1, which illustrates a gesture unlocking mechanism provided by various mobile devices. As illustrated, the mobile device is 102 provides a feature whereby the user traces a pre-defined finger gesture across the display to unlock the phone. As shown, a grid comprising 3-by-3 elements is displayed to serve as a guide. Note that while a 3-by-3 grid is used to illustrate various embodiments, other grid sizes may also be incorporated. The user traces out the pre-defined unlock pattern using the grid. If the user does not trace the pre-defined unlock pattern with sufficient accuracy, the mobile device 102 is left in a locked state. For example, in the FIG. 1, if the user does not make contact with all five elements in the defined order, the mobile device 102 is left in a locked state. In this regard, a relatively high degree of accuracy and precision must be met in order to unlock the mobile device 102.

Figure 2:
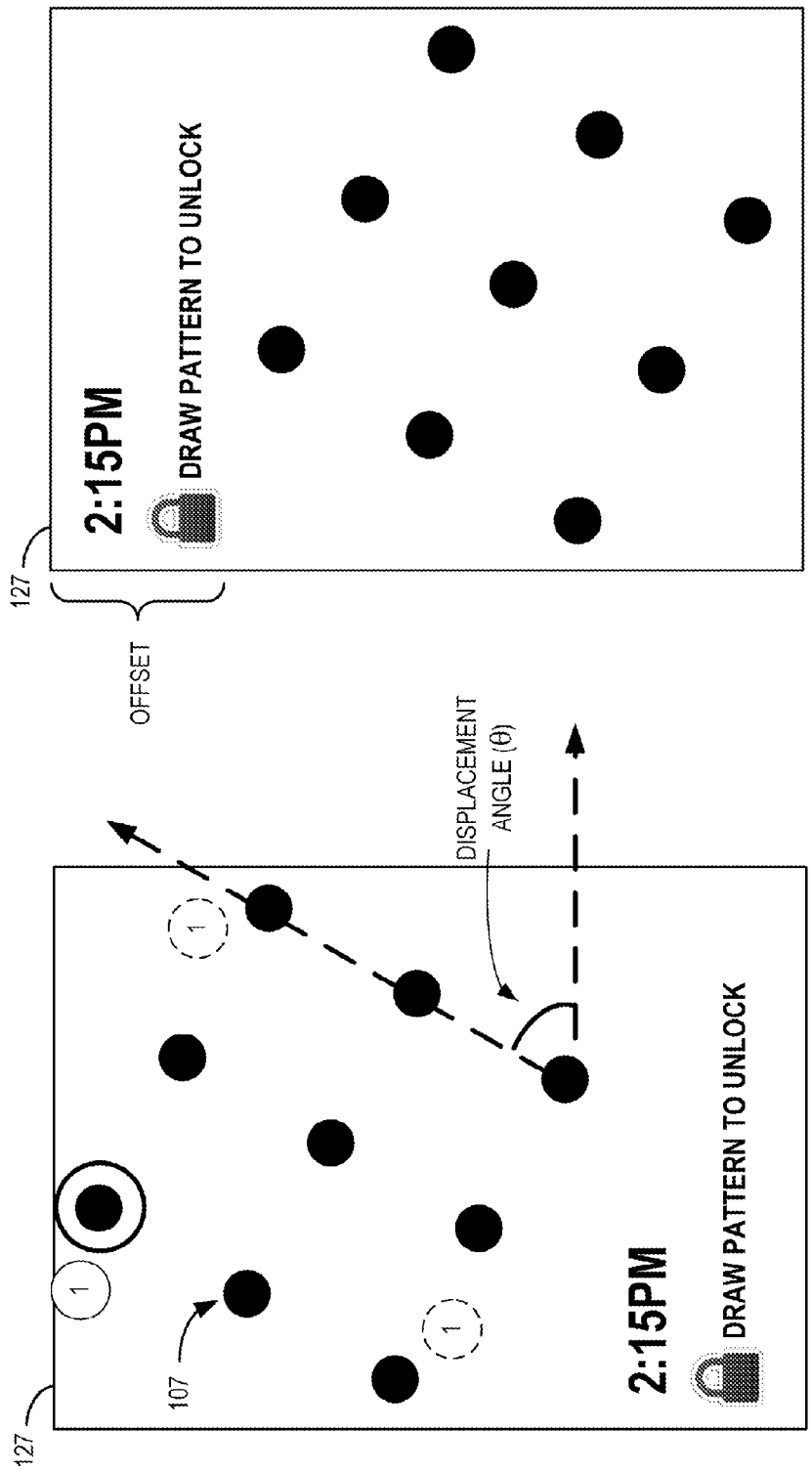
FIG. 2 illustrates a first phase of a multi-tiered unlocking mechanism implemented in accordance with various embodiments, where

Reference is made to FIG. 2, which illustrates a multi-tiered unlocking scheme implemented in accordance with various embodiments. In a first tier, the grid normally shown to users is reoriented and/or displaced by an offset. Specifically, the grid is rotated by a reorientation angle (θ). To ensure that the rotated grid remains in the display area 127, the grid 107 is also rescaled as needed. In the grid normally shown to users, the starting point for the finger gesture, as designated by the "1", is the element in the upper left hand side. Once the grid is reoriented, the starting point shifts accordingly. However, the starting point can be any of the corner elements, as shown in FIG. 2. To help the user determine where the starting pointing is, the element can be highlighted. For example, the element may be circled, displayed in a different color, blinking, and so on to provide the user with the starting point for tracing the unlock pattern. However, if the magnitude of the reorientation angle is sufficiently less than 45 degrees, then highlighting the starting point may be redundant. Thus, for some embodiments, the starting point is highlighted based on the value of the reorientation angle, where highlighting is not performed if the reorientation angle is less than a predetermined value.

Figure 3:
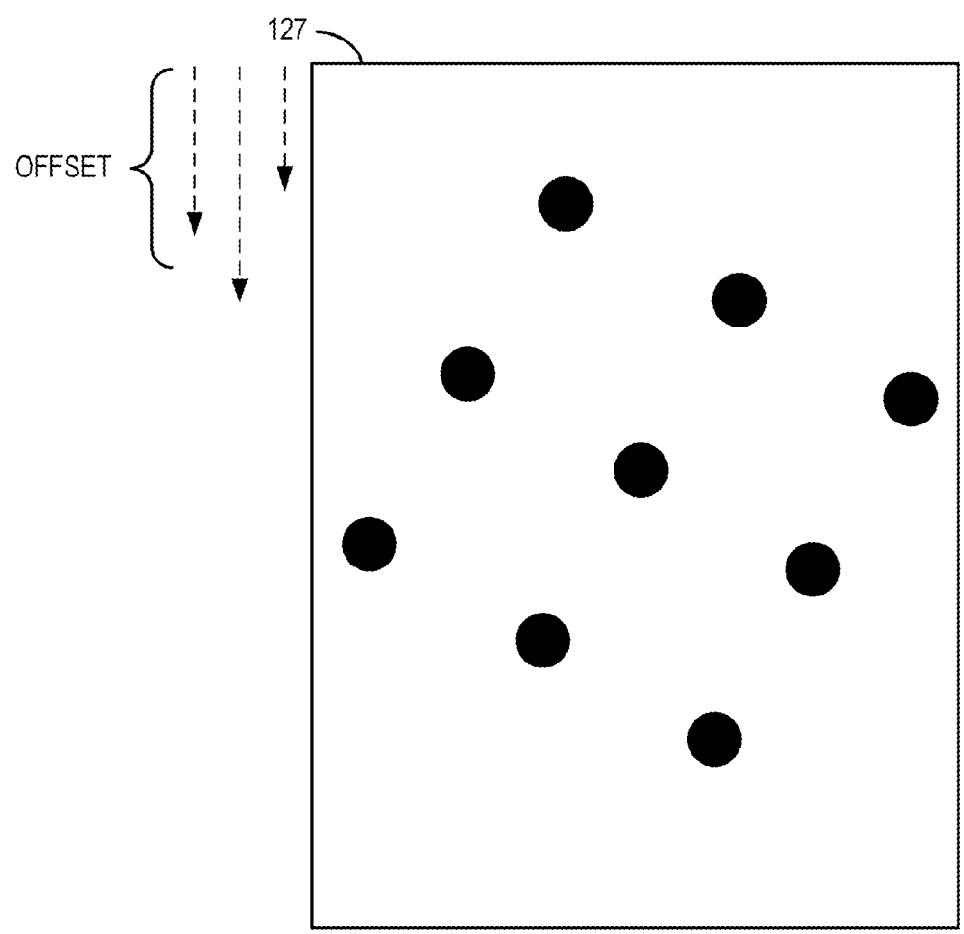
FIG. 3 illustrates the use of a continuous offset value for displacing the grid.

The grid 107 is also displaced by an offset amount. For some embodiments, the grid 107 is either aligned with the top or the bottom border. However, in other embodiments, the onscreen message ("Draw pattern to unlock") is removed, and the grid 107 can be displaced by any amount (as shown in FIG. 3) such that the offset is not limited to discrete offset values. As will be described in more detail later, the reorientation angle, starting point, and the offset are assigned by a random generator so that the exact location of the grid 107 is more unpredictable.

Figure 4:
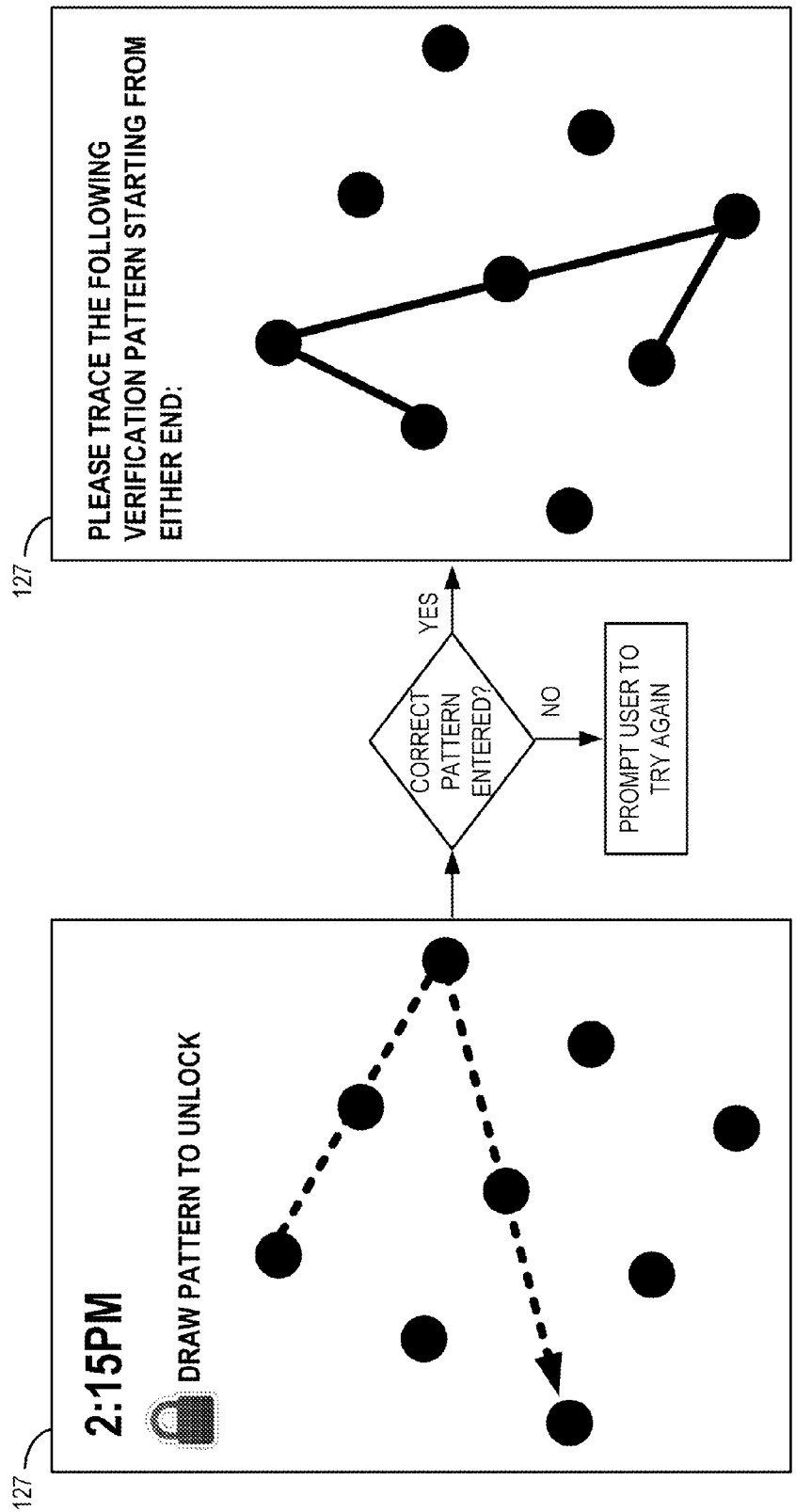
FIG. 4 illustrates another aspect of a multi-tiered unlocking mechanism implemented in accordance with various embodiments, where a verification phase is used for unlocking the mobile device.

Reference is now made to FIG. 4, which illustrates the second tier of the security mechanism. If the user successfully traces the unlock pattern, the user is then prompted to enter a verification pattern shown on the display 127. Essentially, the user is prompted to enter another pattern in order to apply a misleading or "fake" smudge on the surface of the display 127, thereby making it more difficult for a third party to determine the unlock pattern required to access the mobile device 102. As shown in the illustration, if the user is unsuccessful in tracing the unlock pattern, the user is ask to try again and does not undergo the verification phase. As mentioned above, one purpose of the verification pattern is to apply a secondary smudge mark on the surface of the display 127 to make it more difficult to determine what the unlock pattern is by merely observing the surface of the display 127.

Figure 5:
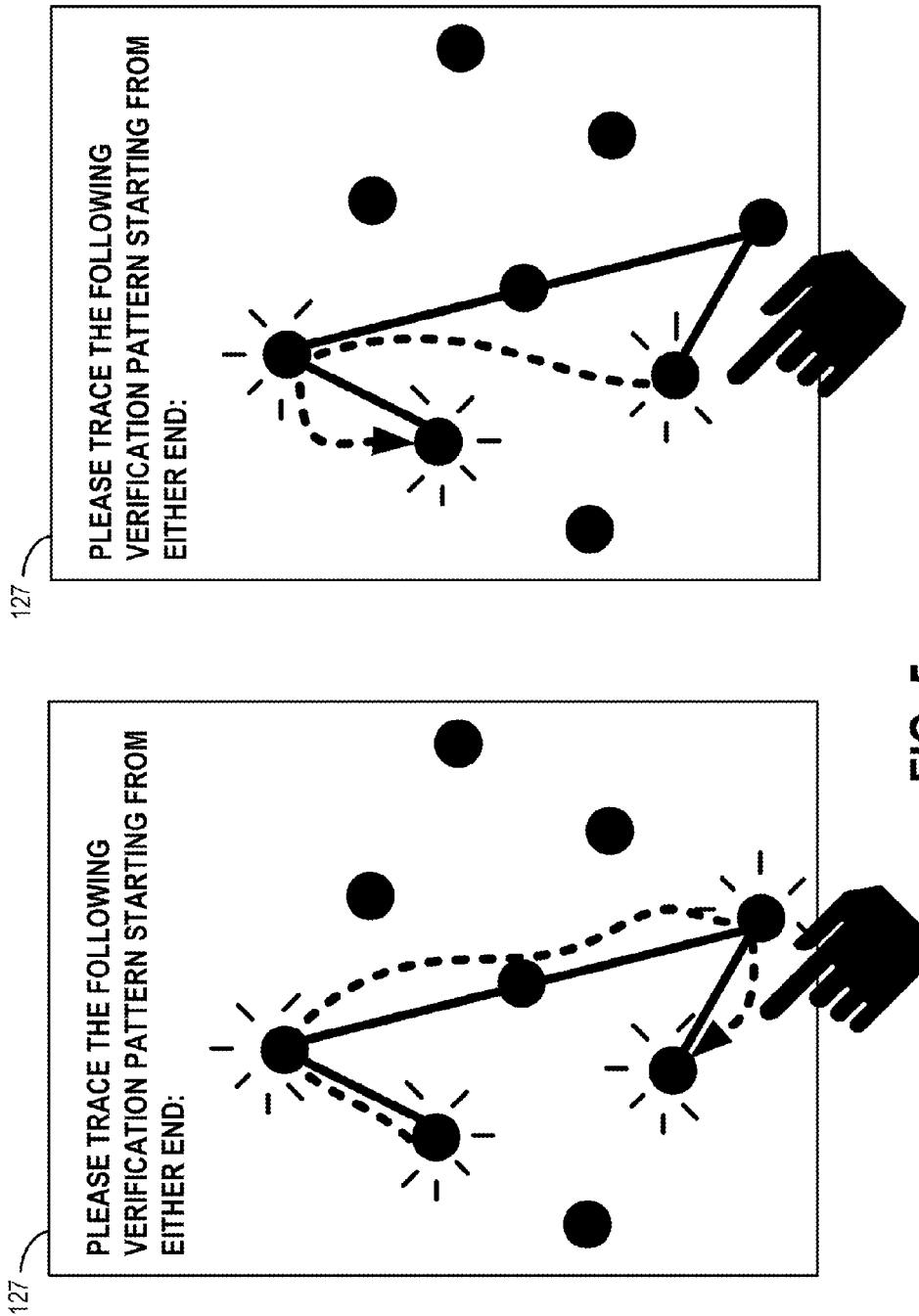
FIG. 5 illustrates the use of a reduce accuracy requirement for successfully tracing the verification pattern in FIG. 4.

Individuals who own mobile devices will appreciate that having to trace multiple sets of gestures can be tedious, particularly if a high degree of accuracy is required for both tracing the unlock pattern and the verification pattern. For example, if the user unsuccessfully traces the verification pattern, the user may have to then start over and retrace the unlock pattern. As such, various embodiments apply a lower sensitivity/accuracy threshold that must be met by the user in tracing the verification pattern. Reference is made to FIG. 5, which illustrates the application of a lower sensitivity setting for the verification pattern. As one purpose of tracing a verification pattern is to apply a secondary smudge mark on the display 127, the level of precision on the part of the user does not have to be as high as that required for tracing the unlock pattern in the first tier.

As such, a lower sensitivity setting can be applied, whereby a setting of less than 100 percent can be used. For example, a sensitivity setting of 50 percent can be used, whereby the mobile device 102 is unlocked if the user traces at least half of the elements in the path of the verification pattern. With reference to FIG. 5, the verification pattern in this example comprises 5 elements. Normally, all 5 elements must be traced (in the proper order) when tracing an unlocking pattern. However, for the verification phase, the user can be allowed to trace 3 of the 5 elements in the verification path and still successfully unlock the phone. For some implementations, the user will be allowed to trace the verification pattern in any order (e.g., from either end of the verification pattern). In this regard, a gesture that approximates the verification pattern shown on the display 127 will be sufficient for unlocking the mobile device 102, as shown in the two example scenarios in FIG. 5.

Figure 6:
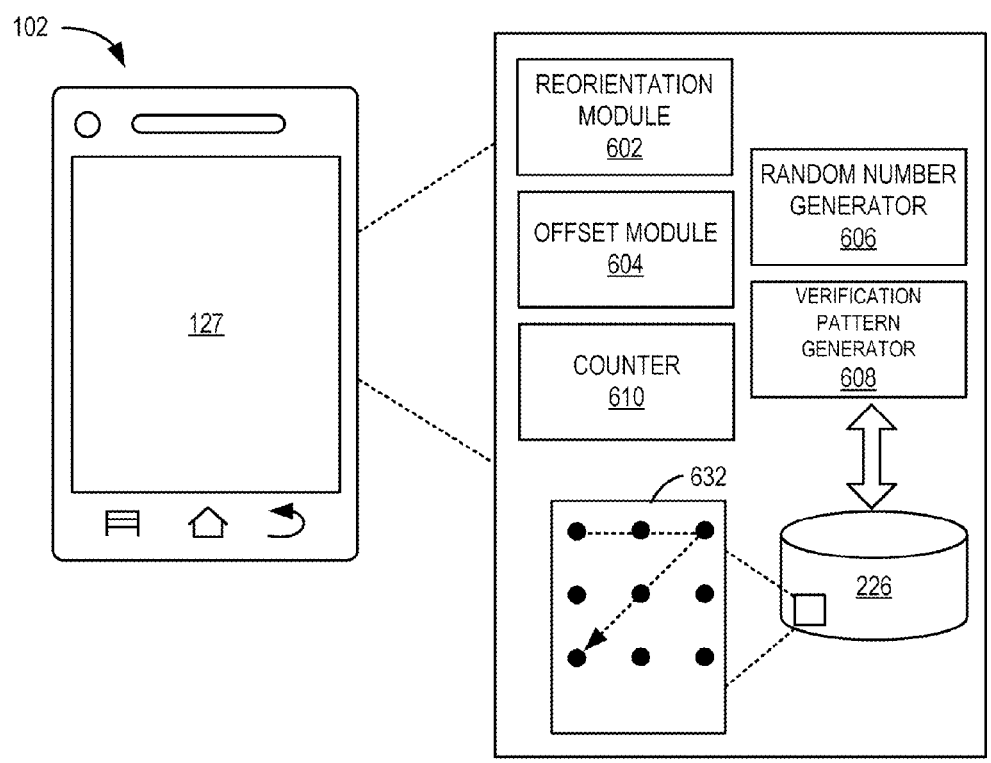
FIG. 6 is a block diagram of a mobile device configured to implement a tiered security procedure for unlocking the mobile device.

A description of a system for unlocking a mobile device 102 is now described followed by a discussion of the operation of the components within the system. FIG. 6 is a block diagram of a mobile device 102 configured to implement a multi-tiered security procedure for unlocking the mobile device 102. The mobile device 102 includes a display 127, which normally comprises a touchscreen for receiving traces or gestures from a user. The mobile device 102 comprises a reorientation module 602 configured to reorient an existing unlock pattern 632 on the display 127. As described earlier, the reorientation of the grid is performed according to a reorientation angle. To obtain the reorientation angle, the reorientation module 602 interfaces with a random number generator 606 configured to provide one or more numbers used by the reorientation module to define a reorientation angle. For some embodiments, once the reorientation module 602 reorients the grid on the display 127, the reorientation module 602 may indicate to the user which element within the grid is the origin of the grid in order to provide the user with a reference point. Referring back briefly to the example in FIG. 2, the origin is circled, thereby providing the user with a reference point in which to trace the unlock pattern. As described earlier, other indicators may be used, including, but not limited to, a blinking element, a different colored element, and so on.

Referring back to FIG. 6, the mobile device 102 further comprises an offset module 604 configured to displace the grid by an amount according to an input received from the random number generator 606. As shown in the example of FIG. 3, the offset is not limited to discrete offset values, whereby the grid can be shifted by any amount on the display 127. The mobile device 102 further comprises a counter 610 configured to track the number of times the user has unlocked (or attempted to unlock) the mobile device 102. For some embodiments, the reorientation module 602 and the offset module 604 are configured to modify the location of the grid on a periodic basis. For example, the reorientation module 602 and the offset module 604 may be configured to modify the location of the grid after every 5 (successful or unsuccessful) attempts to unlock the mobile device 102. The period itself may be random. For example, the reorientation module 602 and the offset module 604 may adjust the location of the grid after every 5 attempts, then after every 2 attempts, then after every 6 attempts, and so on where a ceiling may be applied to the period so that the period is not too high.

The mobile device 102 further comprises a verification pattern generator 608. In the multi-tiered security framework described, the verification pattern generator 608 is configured to generate a random verification pattern once the user successfully traces the unlock pattern. The verification pattern displays a randomly generated verification pattern on the display 127 for the user to trace, which results in a secondary or "fake" smudge being applied to the surface of the display 127. This additional security measure makes it more difficult for unauthorized users to determine the unlock pattern by examining the surface of the display 127. As shown in FIG. 6, the verification pattern generator 608 examines the unlock pattern 632 stored in mass storage 226 of the mobile device 102 and compares it to the generated verification pattern to ensure that the verification pattern and the unlock pattern do not overlap (or substantially overlaps). This results in multiple sets of unique smudge marks being applied to the surface of the display 127.

Figure 7:
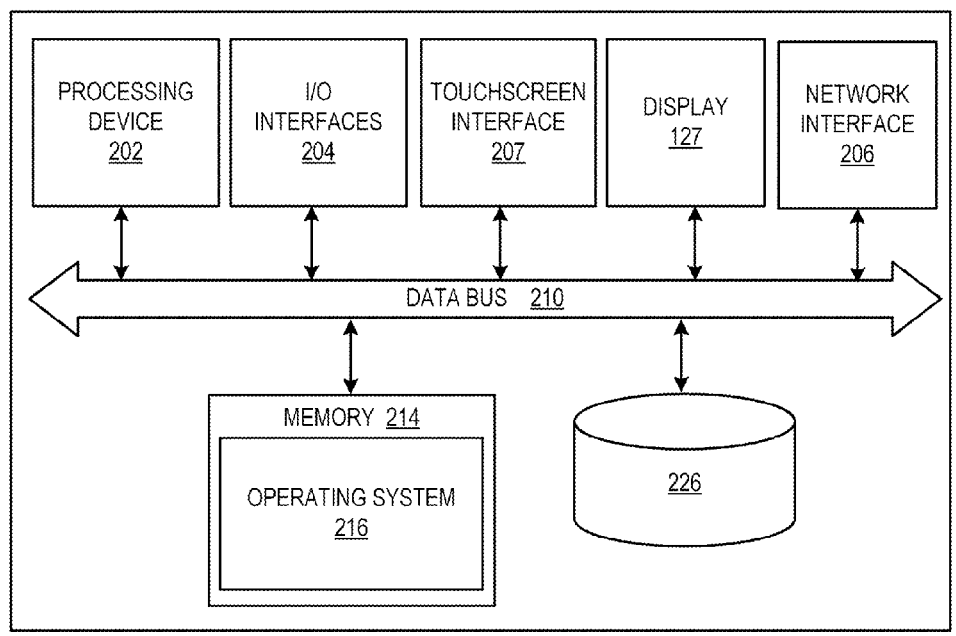
FIG. 7 illustrates an embodiment of the mobile device in FIG. 6.

FIG. 7 illustrates an embodiment of the mobile device 102 in FIG. 6. The mobile device 102 may be embodied as a smartphone but may also be embodied in any one of a wide variety of wired and/or wireless computing devices. As shown in FIG. 7, the mobile device 102 comprises memory 214, a processing device 202, a number of input/output interfaces 204, a network interface 206, a display 127, a touchscreen interface 207, and mass storage 226, wherein each of these devices are connected across a local data bus 210. Those skilled in the art will appreciate that the mobile device 102 includes other devices not shown for purposes of brevity.

The processing device 202 may include any custom made or commercially available processor, a central processing unit (CPU) or an auxiliary processor among several processors associated with the mobile device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements. The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the mobile device 102 depicted in FIG. 6. In accordance with such embodiments, the components are stored in memory 214 and executed by the processing device 202.

The touchscreen interface 207 is configured to receive input from a user via a display 127 and provides such functionality as on-screen buttons, menus, keyboards, etc. that allow users to navigate user interfaces by touch. One of ordinary skill in the art will appreciate that the memory 214 can, and typically will, comprise other components which have been omitted for purposes of brevity. Note that in the context of this disclosure, a non-transitory computer-readable medium stores programs for use by or in connection with an instruction execution system, apparatus, or device. With further reference to FIG. 7, network interface device 206 comprises various components used to transmit and/or receive data over a networked environment such as the ones depicted in FIG. 6.

Figure 8:
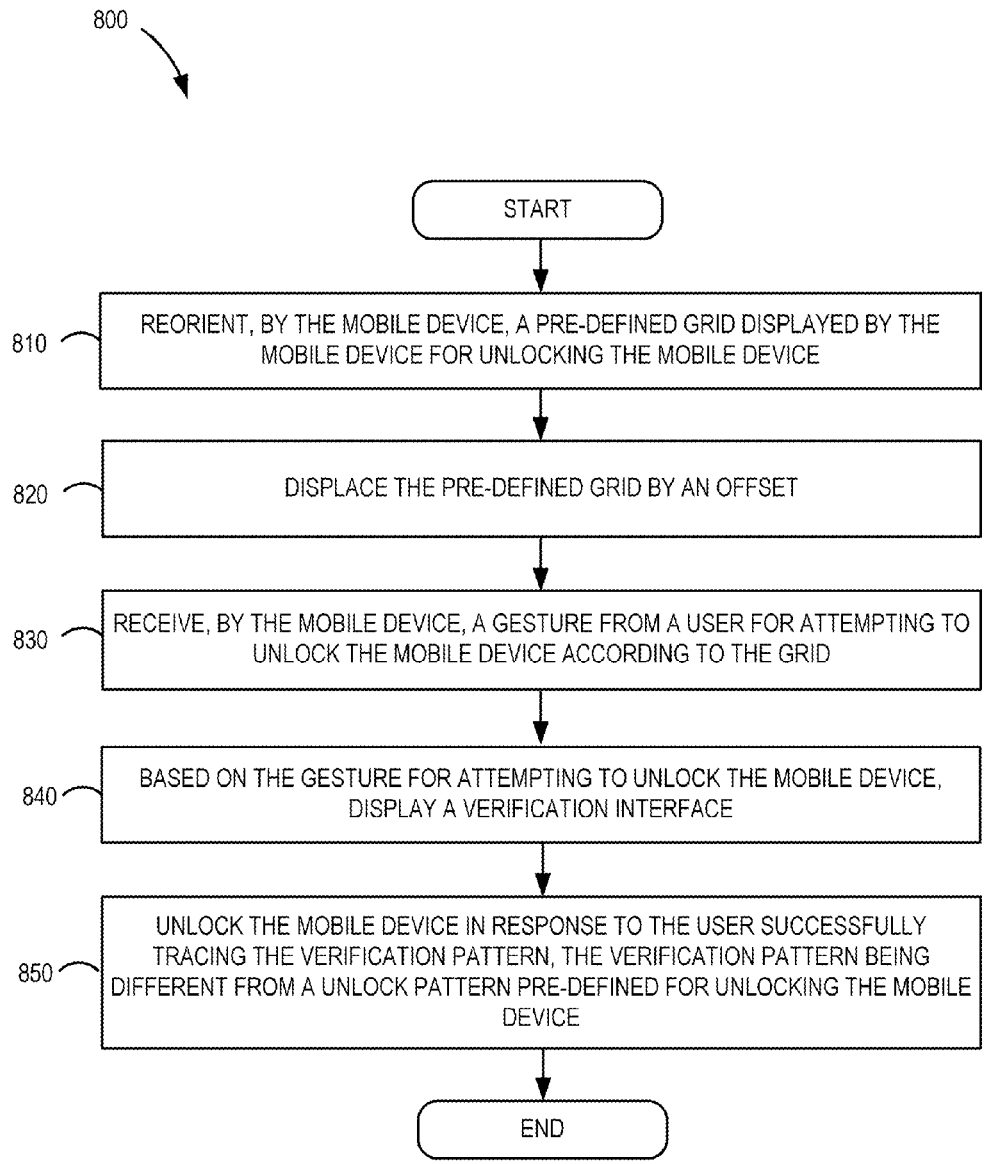
FIG. 8 depicts a top-level flow diagram for a method for unlocking a mobile device implemented in the mobile device of FIG. 6.

Reference is now made to FIG. 8, which is a flowchart 800 of a method for unlocking a mobile device 102. If embodied in software, each block depicted in FIG. 8 represents a module, segment, or portion of code that comprises program instructions stored on a non-transitory computer readable medium to implement the specified logical function (s). In this regard, the program instructions may be embodied in the form of source code that comprises statements written in a programming language or machine code that comprises numerical instructions recognizable by a suitable execution system such as the mobile device 102 shown in FIG. 6. The machine code may be converted from the source code, etc. If embodied in hardware, each block may represent a circuit or a number of interconnected circuits to implement the specified logical function(s).

Although the flowchart 800 of FIG. 8 shows a specific order of execution, it is understood that the order of execution may differ from that which is depicted. In block 810, the mobile device 102 reorients a pre-defined grid 107 displayed by the mobile device for unlocking the mobile device. Generally, a user enters an unlock pattern based on the location of the pre-defined grid on the mobile device 102. In block 820, the pre-defined grid 107 is displaced by an offset. In block 830, the mobile device 102 receives a gesture from a user for attempting to unlock the mobile device 102 according to the grid 107. In block 840, a verification interface is displayed based on the gesture for attempting to unlock the mobile device 102. In block 850, the mobile device 102 is unlocked in response to the user successfully tracing the verification pattern. Generally, the verification pattern will be different from the unlock pattern 632 used for unlocking the mobile device.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for unlocking a mobile device, comprising:
receiving, by the mobile device, a predefined unlock pattern on a grid of elements, the predefined unlock pattern comprising a connected set of the elements, the predefined unlock pattern having a first starting point on the mobile device;
generating, by the mobile device, a reorientation angle and an offset;
displaying a user interface for unlocking the mobile device, the user interface comprising the grid, the grid being displayed according to the reorientation angle and the offset,
wherein the entire grid is rotated by the reorientation angle and displaced by the offset such that the predefined unlock pattern exhibits a second starting point rotated and displaced from the first starting point:
receiving, by the mobile device, a first gesture connecting elements on the grid displayed according to the reorientation angle and the offset for attempting to unlock the mobile device;
in response to the first gesture matching the predefined unlock pattern within a first degree of accuracy, displaying a verification pattern of a connected set of the elements on the grid on a second user interface, wherein the first degree of accuracy is measured based on a number of the elements of the predefined unlock pattern traced by the first gesture on the reoriented and displaced grid;
receiving, by the mobile device, a second gesture based on the displayed verification pattern; and
in response to the second gesture matching the verification pattern within a second degree of accuracy in which as few as one half of the elements of the verification pattern are traced by the second gesture, unlocking the mobile device, wherein the first degree of accuracy is higher than the second degree of accuracy.

2. The method of claim 1, wherein the verification pattern is randomly generated, and wherein the verification pattern is different from the predefined unlock pattern for unlocking the mobile device.

3. The method of claim 1, wherein generating the reorientation angle and the offset comprises generating the reorientation angle and the offset according to one or more random values.

4. The method of claim 3, wherein generating the reorientation angle and the offset according to one or more random values is performed once every predetermined number of attempts by a user to unlock the mobile device.

5. The method of claim 1, further comprising upon displaying the grid displayed according to the reorientation angle and the offset, emphasizing an element within the grid based on a value of the reorientation angle, wherein the emphasized element serves as the starting point for a user to input the gesture.

6. The method of claim 5, wherein emphasizing the element is performed only if the value of the reorientation angle is greater than a threshold angle.

7. The method of claim 1, wherein the grid comprises a predetermined number elements.

8. The method of claim 1, further comprising rescaling a size of the entire grid responsive to at least one of the elements of the rotated and displaced grid exceeding a display area of the mobile device.

9. A system for unlocking a mobile device, comprising:
a memory storing instructions; and
a processing device configured by the instructions to:
receive, by the mobile device, a predefined unlock pattern on a grid of elements, the predefined unlock pattern comprising a connected set of the elements, the predefined unlock pattern having a first starting point on the mobile device;
generate, by the mobile device, a reorientation angle and an offset;
display a user interface for unlocking the mobile device, the user interface comprising the grid, the grid being displayed according to the reorientation angle and the offset,
wherein the entire grid is rotated by the reorientation angle and displaced by the offset such that the predefined unlock pattern exhibits a second starting point rotated and displaced from the first starting point:
receive, by the mobile device, a first gesture connecting elements on the grid displayed according to the reorientation angle and the offset for attempting to unlock the mobile device;
in response to the first gesture matching the predefined unlock pattern within a first degree of accuracy, displaying a verification pattern of a connected set of the elements on the grid on a second user interface, wherein the first degree of accuracy is measured based on a number of the elements of the predefined unlock pattern traced by the first gesture on the reoriented and displaced grid;
receive, by the mobile device, a second gesture based on the displayed verification pattern; and
in response to the second gesture matching the verification pattern within a second degree of accuracy in which as few as one half of the elements of the verification pattern are traced by the second gesture, unlocking the mobile device, wherein the first degree of accuracy is higher than the second degree of accuracy.

10. The system of claim 9, wherein the verification pattern is different from the unlock pattern.

11. The system of claim 9, wherein the processing device is configured to generate random reorientation angle and offset values.

12. The system of claim 9, wherein the processing device is configured to reorient the grid once every predetermined number of attempts by the user to unlock the mobile device.

13. The system of claim 9, wherein the processing device is configured to displace the grid once every predetermined number of attempts by the user to unlock the mobile device.

14. The method of claim 9, wherein upon reorienting the grid according to the reorientation angle and displacing the grid according to the offset, an element within the grid is emphasized based on a value of the reorientation angle, wherein the emphasized element serves as the starting point for a user to trace the unlock pattern.

15. A non-transitory computer readable recoding medium having recorded thereon a program for unlocking a mobile device, which, when executed by a processor, causes the processor to receive, by the mobile device, a predefined unlock pattern on a grid of elements, the predefined unlock pattern comprising a connected set of the elements, the predefined unlock pattern having a first starting point on the mobile device;

generate, by the mobile device, a reorientation angle and an offset;

display a user interface for unlocking the mobile device, the user interface comprising the grid, the grid being displayed according to the reorientation angle and the offset, wherein the entire grid is rotated by the reorientation angle and displaced by the offset such that the predefined unlock pattern exhibits a second starting point rotated and displaced from the first starting point:

receive, by the mobile device, a first gesture connecting elements on the grid displayed according to the reorientation angle and the offset for attempting to unlock the mobile device;

in response to the first gesture matching the predefined unlock pattern within a first degree of accuracy, displaying a verification pattern of a connected set of the elements on the grid on a second user interface, wherein the first degree of accuracy is measured based on a number of the elements of the predefined unlock pattern traced by the first gesture on the reoriented and displaced grid;

receive, by the mobile device, a second gesture based on the displayed verification pattern; and in response to the second gesture matching the verification pattern within a second degree of accuracy in which as few as one half of the elements of the verification pattern are traced by the second gesture, unlocking the mobile device, wherein the first degree of accuracy is higher than the second degree of accuracy.

16. The non-transitory computer readable recording medium of claim 15, wherein reorienting and displacing the grid is performed once every predetermined number of attempts by the user to unlock the mobile device.

17. The non-transitory computer readable recording medium of claim 15, wherein reorienting the grid is performed according to a randomly generated reorientation angle.

18. The non-transitory computer readable recording medium of claim 15, wherein displacing the grid is performed according to a randomly generated offset.

19. The non-transitory computer readable recording medium of claim 15, further comprising upon reorienting the pre-defined grid and displacing the pre-defined grid according to the offset, emphasizing an element within the grid based on a value of the reorientation angle, wherein the emphasized element serves as the starting point for a user to input the gesture.

* * * * *